US008031456B2

(12) United States Patent
Wang

(10) Patent No.: US 8,031,456 B2
(45) Date of Patent: Oct. 4, 2011

(54) EXPLOSION-ROOF AND FLAMEPROOF PULLOUT SAFETY SURGE ABSORBING MODULE

(75) Inventor: Robert Wang, Luch (TW)

(73) Assignee: Ceramate Technical Co., Ltd., Taoyuan County (TW)

( * ) Notice: Subject to any disclaimer, the term of this patent is extended or adjusted under 35 U.S.C. 154(b) by 385 days.

(21) Appl. No.: 12/464,157

(22) Filed: May 12, 2009

(65) Prior Publication Data

US 2010/0290168 A1 Nov. 18, 2010

(51) Int. Cl.
*H02H 1/00* (2006.01)

(52) U.S. Cl. ........................................ 361/118; 361/117

(58) Field of Classification Search ........... 361/117–120
See application file for complete search history.

(56) References Cited

U.S. PATENT DOCUMENTS 6,430,019 B1 * 8/2002 Martenson et al. ........... 361/124
7,483,252 B2 * 1/2009 de Palma et al. .............. 361/127
7,839,257 B2 * 11/2010 Cernicka ....................... 337/206

* cited by examiner

*Primary Examiner* — Danny Nguyen
(74) *Attorney, Agent, or Firm* — Ming Chow; Sinorica, LLC

(57) ABSTRACT

An explosion-proof and flameproof pullout safety surge-absorbing module includes a surge-absorbing unit, a protective unit, a function member, and a hot melt component. The unit has a body defining an electrode side. The middle section of electrode side defines a partially exposed electrode side further connected to a first pin. The protective component includes a base and a top cover conjoint to the base. The body is between the base and the top cover. The function member includes a recovery component and a function part. The recovery component is flexible, of which one terminal connects the base and the other terminal connects the function part pivoting onto the base and working in a first state and a second state. In the first state, one terminal of the function part is connected to the partially exposed electrode side; in the second state, the hot melt component is heated and melt.

8 Claims, 6 Drawing Sheets

EXPLOSION-ROOF AND FLAMEPROOF PULLOUT SAFETY SURGE ABSORBING MODULE

BACKGROUND OF THE INVENTION

1. Field of the Invention

This invention relates to an explosion-proof and flameproof pullout safety surge-absorbing module.

2. Description of the Prior Art

Generally, in order to prevent a surge (pulse voltage or pulse current) suddenly caused in daily life from impacting electrical equipment, a surge absorber is provided in the circuit of an electrical appliance for protection. In a conventional circuit, a thermal fuse is further added in the circuit so that the surge absorber, when detecting a surge or a higher temperature, can make the circuit to be open for protection of the equipment or surge absorber.

However, although the thermal fuse is capable of making the circuit of surge absorber to be open, the circuit could not be open and broken for trip in a short time. Thus, the surge absorber could cause explosion or start a fire to damage the equipment or bring a fire accident. Thus, it is necessary to improve the surge absorber.

Further, in U.S. Pat. No. 6,430,019, it is disclosed that a metal spring plate and a voltage sensor component (same as the body according to the present invention) are connected and, when the temperature of voltage sensor component exceeds a default setting, the metal spring plate breaks; however, the electrical connection caused by the electric arc cannot be effectively isolated, thereby the effect of open circuit being not achieved. Likewise, in U.S. Pat. No. 6,430,019, it is disclosed that a damper is provided between the metal spring plate and the voltage sensor component to solve the issue as described above. Although the damper may be used in the structure to solve the issue, the cost of production increases and the physical volume is comparatively higher; the improvement is necessarily made.

Consequently, because of the technical defects of described above, the applicant keeps on carving unflaggingly through wholehearted experience and research to develop the present invention, which can effectively improve the defects described above.

SUMMARY OF THE INVENTION

An explosion-proof and flameproof pullout safety surge-absorbing module according to the present invention comprises a surge-absorbing unit, a protective component, a function member, and a hot melt component. The surge-absorbing unit is formed with a body. Further, electrode sides are separately defined at the opposite sides of the body. A partially exposed electrode side is even defined in the middle section of one of the electrode sides. A first pin is formed and connected to the electrode side. The protective component comprises a base and a top cover conjoint to a side of the base. A body is formed between the base and the top cover. The first pin passes through the base. The function member comprises a recovery component and a function part. The recovery component is flexible, of which one terminal is fixed onto the base and the other one is connected to the function part. Besides, the function part pivots onto the base. The function part works in a first state and a second state. In the first state, the function part lies on the partially exposed electrode side, of which one terminal is electrically connected to the partially exposed electrode side. A hot melt component is fixed between the function part and the partially exposed electrode side. On the other hand, in the second state, the function part is pulled by the recovery component to disconnect from the partially exposed electrode side. The hot melt component is melt and kept away from the section between the function part and the partially exposed electrode side. Further, the function part is connected to a second pin passing through the base.

Thus, to prevent a higher temperature from impacting the body, the safety surge-absorbing module can be connected to a power supply and can have an open circuit by itself when the temperature increases. Further, when the body is damaged and explodes, the body can be covered by the protective component to prevent scattered fragments from causing a fire accident or destruction.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
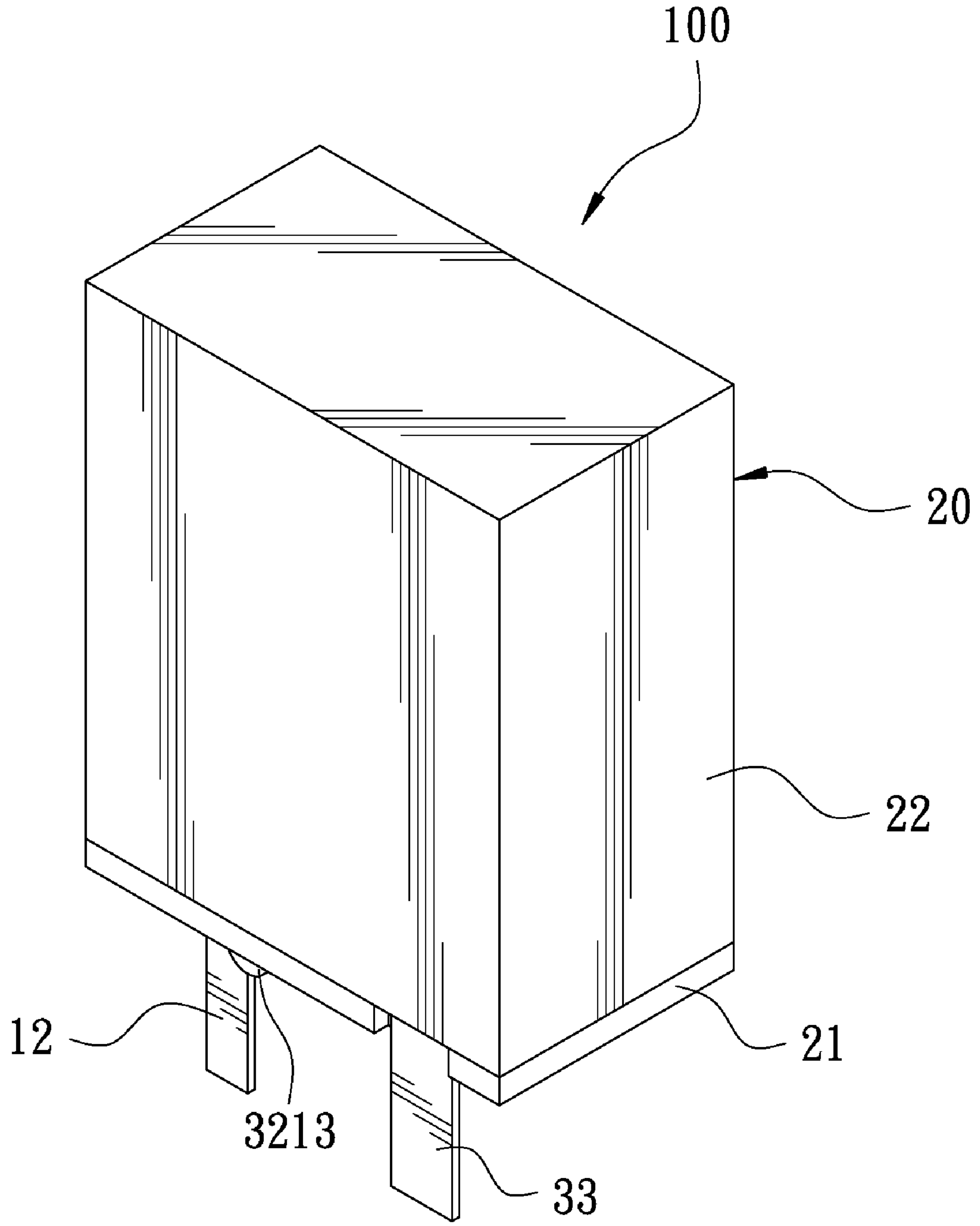
FIG. 1 is a 3D assembly view of a surge-absorbing module according to the present invention.
Figure 2:
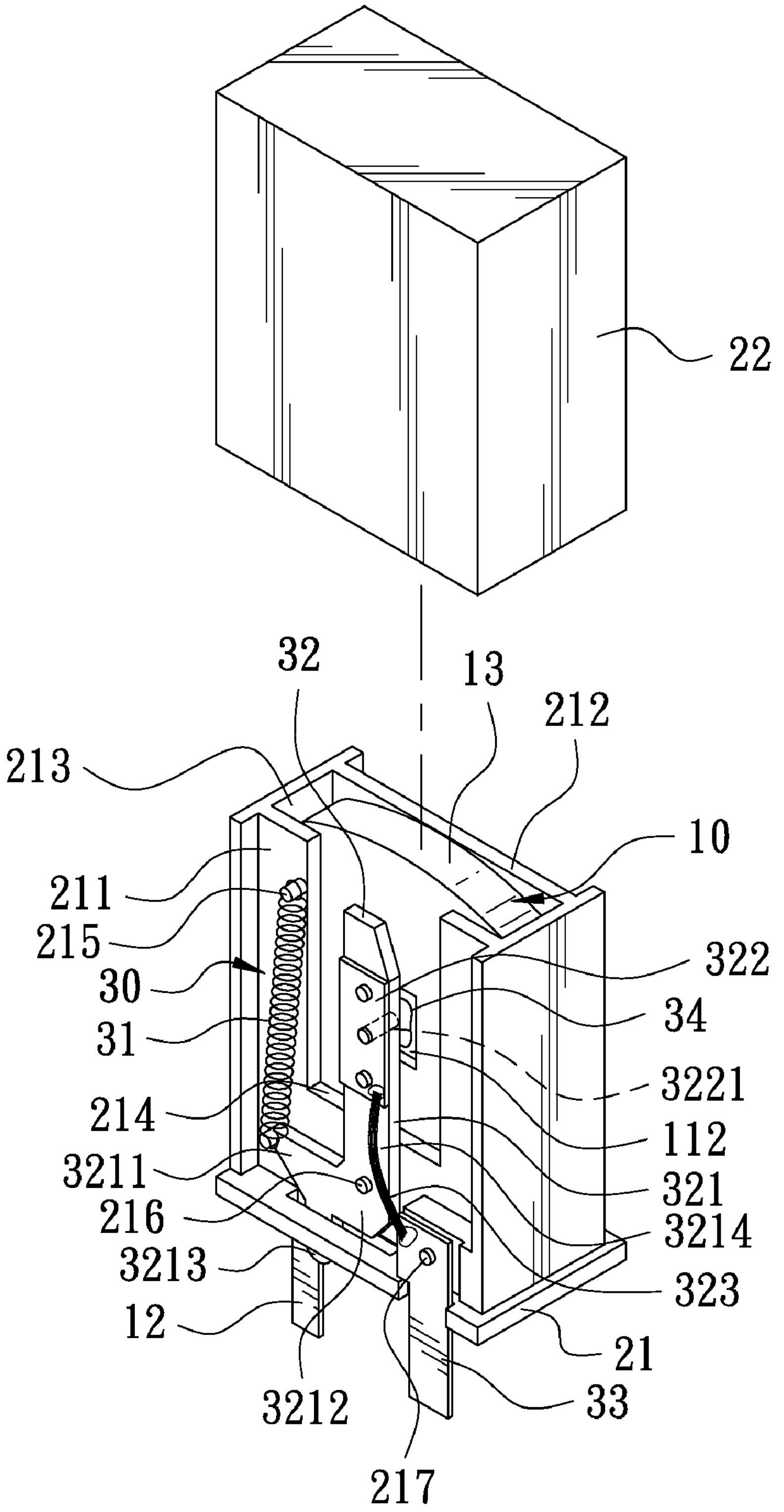
FIG. 2 is a 3D exploded view of the surge-absorbing module according to the present invention.
Figure 3:
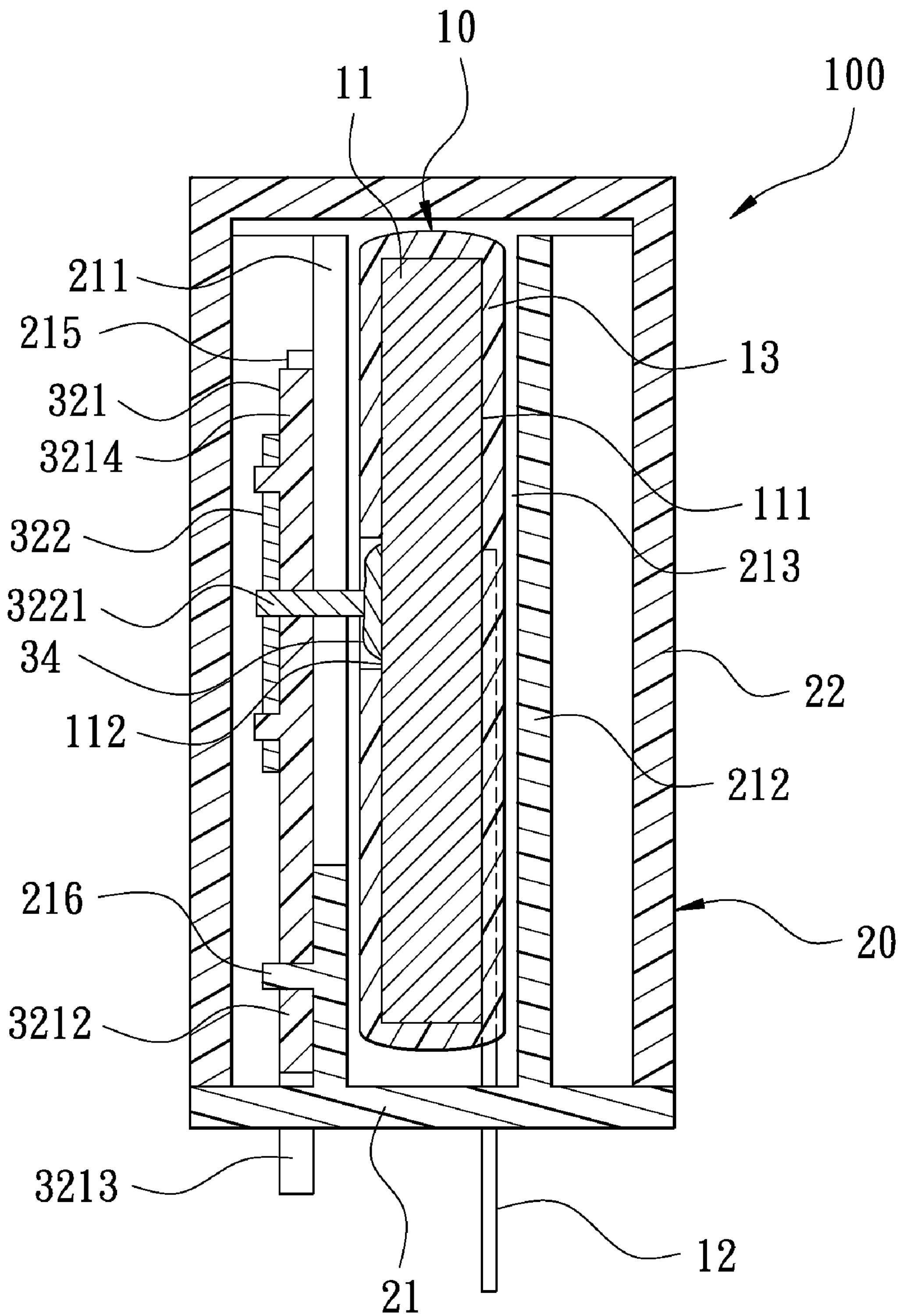
FIG. 3 is a sectional assembly view of a first state in which the surge-absorbing module is in a hot melt component.

Firstly, with reference to FIGS. 1 through 3 shown respectively as a 3D assembly view and a 3D exploded view that illustrate a surge-absorbing module according to the present invention, and a sectional assembly view of the surge-absorbing module in a hot melt component, the safety surge-absorbing module 100 comprises a surge-absorbing unit 10, a protective component 20, and a function member 30.

The surge-absorbing unit 10 is provided with a body 11. An electrode side 111 is defined at opposite sides of the body 11. A first pin 12 is oppositely connected to the electrode side 111. Further, part of the body 11 is covered with epoxy 13. A sectional exposed electrode side 112 is defined at an area of the electrode side 111 of the body 11, in which the area is not covered with the epoxy 13. Besides, the epoxy 13 wraps one terminal of the first pin 12.

The protective component 20 comprises a base 21 and a top cover conjoint to the topside of base 21. The base 21 stretches towards one side of the top cover 22, and a first division plate 211 and a second division plate 212 are thereby provided. A spacing area 213 is formed between the first division plate 211 and the second division plate 212. The body 11 is provided in the spacing space 213. The first pin 12 passes out through the bottom of base 21. Even, a groove 214 is formed at the top of first division plate 211. Further, near the groove 214, the first division plate 211 transversally stretches toward the top cover 22 to form a first spacing shaft 215, a second spacing shaft 216, and a third spacing shaft 217. Next, the top cover 22 covers the base 21 and fully wraps the surge-absorbing unit 10.

Figure 4:
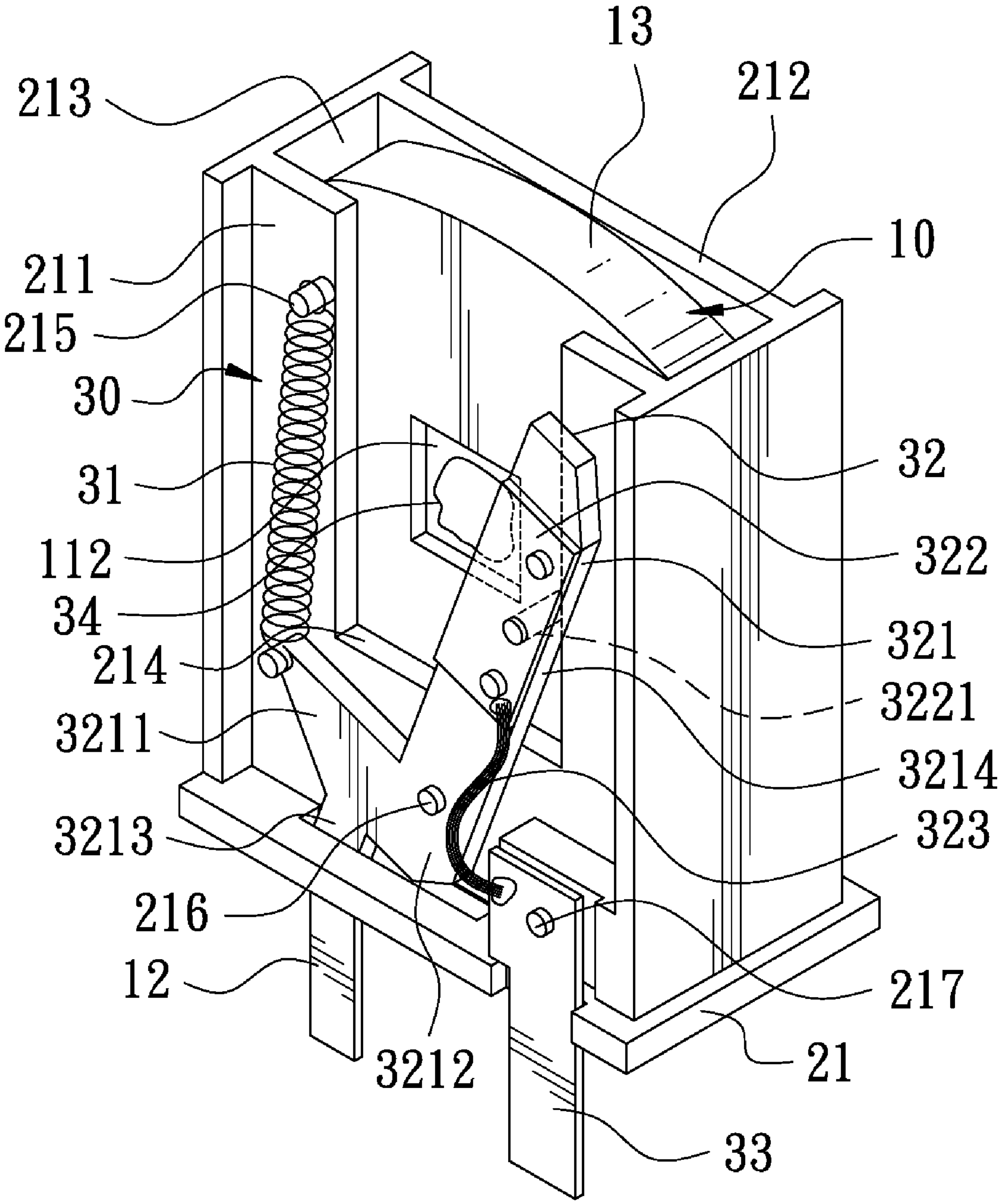
FIG. 4 is a 3D assembly view of a second state in which the surge-absorbing module is in the hot melt component.
Figure 5:
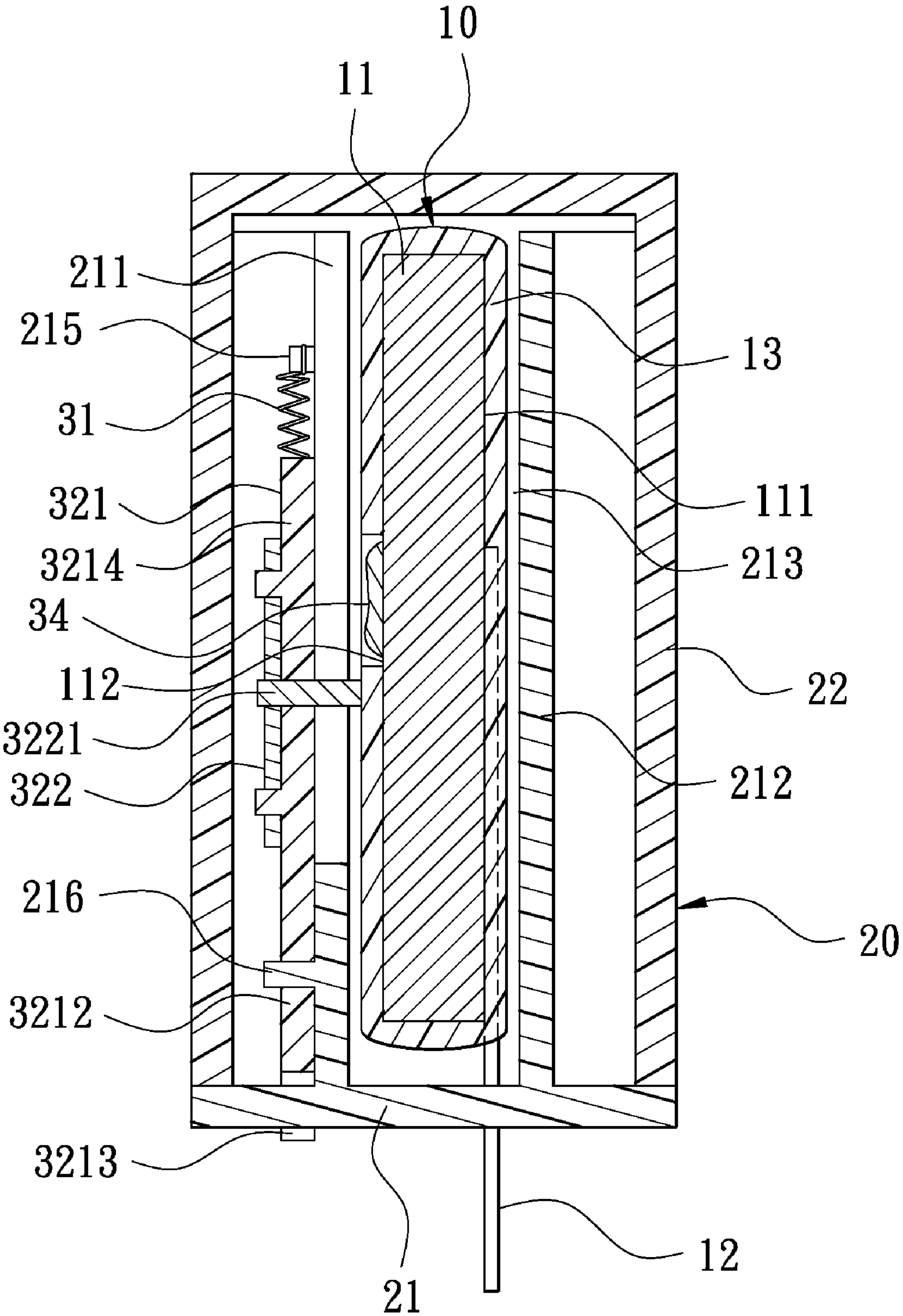
FIG. 5 is a sectional assembly view of the second state in which the surge-absorbing module is in the hot melt component.

With reference to FIGS. 4 and 5 shown respectively as a 3D assembly view and a sectional assembly view that illustrate the surge-absorbing module according to the present invention in the second state, the function member 30 comprises a recovery component 31, a function part 32, a second pin 33, and a hot melt component 34. The recovery component 31 is flexible. In a preferred embodiment of the present invention, the recovery component 31 is a spring. One terminal of the recovery component 31 is connected to the first spacing shaft 215, while the other terminal is connected to the function part 32. Besides, the function part 32 comprises a linking-up sheet 321, an electrically conductive part 322, and a lead wire 323. The linking-up sheet 321 is in the form of L and is further formed with a first connection section 3211, a turn section 3212, a flange 3213, and a second connection section 3214. One terminal of the first connection section 3211 is connected to the recovery component 31, while the other terminal is connected to the turn section 3212. A section between the first connection section 3211 and the turn section 3212 stretches towards one side of the base 21 to form the flange 3213. The flange 3213 passes through the base 21. Further, the turn section 3212 pivots onto the second spacing shaft 216 and further connects to the second connection section 3214. The electrically conductive part 322 is provided at the second connection section 3214 opposite to the other side of the body 11. The electrically conductive part 322 further stretches towards the body 11 to form an electrically conductive pillar 3221. Next, the function part 32 works in a first state and a second state. In the first state, the electrically conductive pillar 3221 of function part 32 passes through the groove 214 and then electrically connects to the partially exposed electrode side 112. A hot melt component 34 is provided between the electrically conductive pillar 3221 and the partially exposed electrode side 112. The hot melt component 34 is featured with a determined melting point. In the preferred embodiment of the present invention, the hot melt component 34 is a soldering tin. Further, in the second state, the temperature of body 11 exceeds the melting point of hot melt component 34, and the hot melt component 34 is thus melt. Being subject to the dragging of recovery component 31, the first connection section 3211 of ling-up sheet 321 synchronously drives the second connection section 3214 along the turn section 3212 as a supporting point to transversally sway in parallel. Even, the second connection section 3214 drives the electrically conductive pillar 3221 to move away from the partially exposed electrode side 112 so that the electrically conductive pillar 3221 can stays at one side of the epoxy 13. The electrically conductive pillar 3221 and the partially exposed electrode side 112 in the circuit are disconnected. Besides, the electrically conductive part 322 in a determined site is connected to the lead wire 323. The lead wire 323 is further connected to the second pin 33. One terminal of the second pin 33 is spaced on the third spacing shaft 217, while the other terminal passes out through the bottom of base 21.

Figure 6:
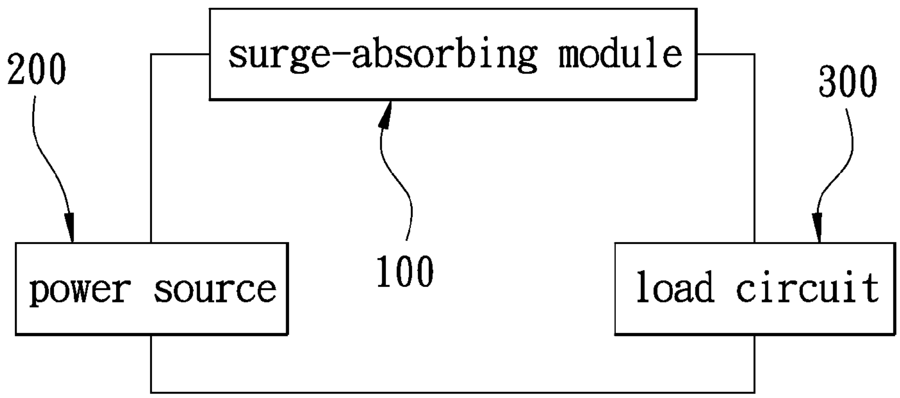
FIG. 6 is a schematic view illustrating the surge-absorbing module that is connected in series to a circuit.

With reference to FIG. 6 shown as a schematic view illustrating the surge-absorbing module that is connected in series to a circuit, the safety surge-absorbing module 100 is connected between a power source 200 and a load circuit 300 through the first pin 12 and the second pin 33. When a higher surge is generated at the terminal of power source 200, the surge passes through the body 11 and is then converted into heat energy. The hot melt component 34 is subject to the heat energy caused by the body 11, so the first state in which the component 34 works is changed into the second state. The recovery component 31 contemporarily shifts the linking-up sheet 321 to a determined site and drives the electrically conductive pillar 3221 to move away from the partially exposed electrode side 112; thus, the power source 200 disconnects from the load circuit 300 for protecting the load circuit 300.

Figure 7:
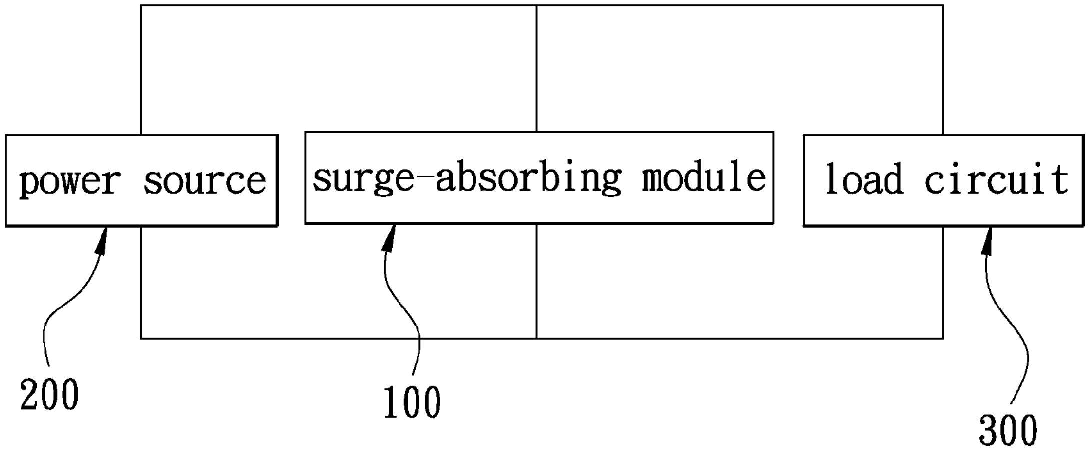
FIG. 7 is a schematic view illustrating the surge-absorbing module that is connected in parallel to the circuit.

Further, with reference to FIG. 7 shown as a schematic view illustrating the surge-absorbing module that is connected in parallel to the circuit, the safety surge-absorbing module 100 is connected in parallel between the power source 200 and the load circuit 300. When the surge is generated at the terminal of power source 200, the surge passes through the body 11 and is then converted into the heat energy to reduce the impact of surge on the load circuit. When the hot melt component 34 is subject to the heat energy caused by the body 11 and exceeds the melting point, the first state in which the hot melt component 34 works is changed into the second state. Besides, the recovery component 31 drags the linking-up sheet 321 to a determined site and drives the electrically conductive pillar 3221 to detach from the partially exposed electrode side 112.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An explosion-proof and flameproof pullout safety surge-absorbing module, mainly comprising:

a surge-absorbing unit having at least one body of which at least one side defines an electrode side of which the middle section defines a partially exposed electrode side that is further connected to a first pin;

a protective component comprising a base and a top cover conjoint to one side of the base, in which the body is formed between the base and the top cover and the first pin passes out through the base; and a function member comprising a recovery component and a function part, in which the recovery component is flexible, of which one terminal is connected to the base and the other terminal is connected to the function part that pivots onto the base and works in a first state and a second state, and in the first state, the function part lies on the partially exposed electrode side and one terminal is electrically connected to the partially exposed electrode side, a hot melt component is provided between the function part and the partially exposed electrode side, and in the second state, the function part is dragged by the recovery component and then disconnects from the partially exposed electrode side, the hot melt component is melt and kept away from a site between the function part and the partially exposed electrode side, and the function part is further connected to a second pin and the second pin passes out through the base.

2. The explosion-proof and flameproof pullout safety surge-absorbing module according to claim 1, wherein part of the body is covered with epoxy, an area, not covered with epoxy, that is formed at the electrode side of one side of the body defines the partially exposed electrode side, and the epoxy wraps around part of the pin.

3. The explosion-proof and flameproof pullout safety surge-absorbing module according to claim 1, wherein the base stretches towards one side of the top cover to form a first division plate and a second division plate that are opposite to each other, a spacing area is formed between the first and second division plates, the body is provided in the spacing area, a groove is formed on the first division plate, one terminal of the recovery component is connected to the first division plate and the other terminal is connected to the function part, and the function part pivots onto the first division plate and passes through the groove to electrically connect to the partially exposed electrode side.

4. The explosion-proof and flameproof pullout safety surge-absorbing module according to claim 3, wherein the function part further comprises a linking-up sheet, an electrically conductive part, and a lead wire, one terminal of the recovery component is connected to the first division plate and the other terminal is connected to the linking-up sheet, the electrically conductive part is provided at one side of the linking-up sheet and electrically connected to the partially exposed electrode side, and the lead wire is connected between the electrically conductive part and the second pin.

5. The explosion-proof and flameproof pullout safety surge-absorbing module according to claim 4, wherein the electrically conductive part stretches towards one side of the partially exposed electrode side to form an electrically conductive pillar of which one terminal is electrically connected to the electrode side.

6. The explosion-proof and flameproof pullout safety surge-absorbing module according to claim 4, wherein the linking-up is in the form of L and is further formed with a first connection section, a turn section, and a second connection section, in which one terminal of the first connection section is connected to the recovery component and the other terminal is connected to the turn section that pivots onto the first division plate and further connects to the second connection section connected to the electrically conductive part.

7. The explosion-proof and flameproof pullout safety surge-absorbing module according to claim 1, wherein the hot melt component is a soldering tin.

8. The explosion-proof and flameproof pullout safety surge-absorbing module according to claim 1, wherein the recovery component is a spring.

* * * * *